3,019,270
STABILIZATION OF VINYL CHLORIDE
Edwin D. Hornbaker, Baton Rouge, La., assignor to Ethyl Corporation, New York, N.Y., a corporation of Delaware
No Drawing. Filed July 22, 1960, Ser. No. 44,517
7 Claims. (Cl. 260—652.5)

This invention relates to the art of stabilizing vinyl chloride and particularly to inhibiting vinyl chloride monomer against prepolymerization.

In commercial practice vinyl chloride monomer is generally inhibited immediately after initial preparation to prevent pre-polymerization, e.g., polymerization of the monomer prior to the time of its intended use. When prepolymerization of vinyl chloride occurs it creates an extremely troublesome and expensive problem for not only is the polymerized vinyl chloride itself completely wasted but in addition the preformed polymer must be removed from the remaining monomer before the monomer itself is fit for subjection to desirable polymerization conditions. Prepolymerization also produces acute problems when polymerization occurs in lines, valves, storage tanks and other facilities. When it occurs it is often necessary to employ drilling and cutting tools to remove the polymer and thereby salvage the equipment.

On the other hand, prepolymerization can be prevented by dissolving certain stabilizer compounds in the monomer, but this unfortunately presents further difficulties. Thus, prior to the normal and desirable polymerization of vinyl chloride utilizing a desirable polymerization recipe, it is necessary to destroy the effect of the inhibiting compounds or to first effect their removal from the monomer. To overcome their effect, excesses of catalysts have been suggested for use in the polymerization recipe. This remedy has generally been unsuccessful however and is seldom used. Because of adverse effects produced by excess catalyst, it is normally desirable to completely remove the inhibitor. This is normally accomplished by distillation. In some instances more than one treatment is necessary and to insure complete removal of the inhibiting compound a washing process is employed. Often as not, a washing process is followed by distillation.

In commercial practice because of the difficulties produced by the addition of a stabilizing additive to the monomer it is often attempted to avoid this addition by using the monomer fairly quickly after its manufacture. But this expediency is not always practical as where the monomer must be stored, or especially where, as in the majority of cases, the monomer must be shipped from one location to another. Were it possible to keep the monomer completely free of impurities at all times and out of all contact with air or oxygen containing compounds, the expediency of leaving out an inhibitor for a time might be successful because under these conditions the monomer will not polymerize. But unfortunately, as would be expected, it is virtually impossible to maintain monomer under these conditions at all times and consequently prepolymerization takes its toll of the uninhibited monomer. Those attempting to avoid the use of inhibiting compounds in the monomer must pay this toll.

Attempts have also been made to stabilize or to retard prepolymerization of the vinyl chloride monomer by washing it with aqueous solutions containing reducing agents, the theory being that this will affect the removal of forming or accumulating impurities and thus prevent premature polymerization. This technique has not only met with failure but has produced even greater instability of the monomer.

Despite the foregoing and other adverse effects it is an object of the present invention to advance the state of the art by offering to industry a new method for the stabilization of vinyl chloride monomer. In particular, it is an object of this invention to provide a new method for stabilizing vinyl chloride monomer against prepolymerization. Further, it is an object of this invention to provide chloride monomer conditioned against prepolymerization but yet capable of polymerizing in normal polymerization processes without adverse effect upon polymerization processes or upon the properties of polymer from such processes. Other objects will appear hereinafter.

The foregoing and other objects are accomplished pursuant to this invention which comprises contacting vinyl chloride monomer with activated alumina or solid sodium hydroxide, or a mixture of these compounds. In other words, once the monomer has been percolated through or otherwise contacted with a bed of these materials it possesses a far greater resistance to undesirable prepolymerization than it would in the absence of such treatment. While the alumina or caustic, or mixture thereof can be kept in contact with the monomer until such time as it is used, it is preferable to effect the above contacting operation and then separate the monomer from the treating agent.

The alumina is a preferred stabilizing agent for vinyl chloride monomer for this stabilizing agent is capable of stabilizing the monomer for considerable periods of time upon a relatively short contact time and is capable of being used for long periods of time without the necessity of having to reactivate the alumina. Preferably also the vinyl chloride monomer is contacted with the activated alumina or solid sodium hydroxide in a closed system, this assuring greater and more intimate contact between the monomer and the stabilizing agent. This operation is best carried out by passing the vinyl chlorile monomer to be stabilized through a column containing activated alumina, solid sodium hydroxide or a mixture of these compounds. The monomer thus treated is stabilized against prepolymerization under ordinary storage or transit conditions for a considerable period of time. The degree of stabilization of the monomer is somewhat dependent upon the contact time between the monomer and the activated alumina or solid sodium hydroxide. Generally it is desirable to maintain the monomer in contact with the alumina or solid sodium hydroxide for a period of from about 2 minutes to about 10 minutes. It is preferable that the contact time between the monomer and the alumina or sodium hydroxide be not less than about 5 minutes so as to provide a high degree of stabilization, although even momentary contact will provide at least a small degree of protection against prepolymerization. On the other hand, a contact time of from about 5 to about 8 minutes will provide generally optimum protection against prepolymerization. A greater contact time can be employed through the monomer stabilization benefits derived therefrom are not proportional to the increased time and generally a contact time of greater than 10 minutes is unnecessary. Optimum monomer stabilization benefits on a cost-effectiveness basis are generally derived by providing a contact time of about 6 minutes.

Where activated alumina and solid sodium hydroxide are employed as a mixture it is generally preferable that the alumina:caustic ratio to be about 2:1 because this produces optimum benefits on a cost-effectiveness basis. The two compounds can be mixed together in any ratio however. In addition, it is also quite feasible to provide two separate beds or columns, one containing alumina and the other caustic. The monomer may be treated with the alumina and the caustic in any order.

Vinyl chloride monomer stabilized pursuant to this invention is generally resistant to prepolymerization under normal plant conditions for a period of at least about 60 days and even longer.

Stabilization of vinyl chloride monomer against prepolymerization by contacting it with activated alumina or solid sodium hydroxide, or both, not only is a unique process, but it is a process possessing a highly valuable feature, viz., simplicity of operation. Thus, all that is essential is that the vinyl chloride monomer be contacted (generally for a time as above-specified) with particles of activated alumina or solid particles of sodium hydroxide, or both. Compounds of any particle size can be employed but in the preferred embodiment wherein the compounds are maintained within a closed system, particles of a specified size eliminate pluggage problems and provide other more optimum process conditions. Thus, solid sodium hydroxide or alumina pellets having an average diameter of from about 0.1 inch to about 0.5 inch can be employed in a simple iron shell having an inlet and outlet through which vinyl chloride is fed into and removed from the vessel. An even more preferred size is from about 0.1 inch to about 0.25 inch average particle size, e.g., 3 to 8 mesh (Tyler standard screen scale). The column is preferably operated under ambient temperature and pressure conditions, thus creating an extremely low cost operation.

The following examples are illustrative of the invention, but are not intended as limiting.

An iron cylindrical shaped shell of tubular column was provided with a valved inlet and outlet, at the bottom and top of the column respectively, for introduction and removal of the vinyl chloride monomer. A port at the top of the column provided an opening into which fresh activated alumina or solid caustic soda could be fed, and a similar port at the bottom of the column provided a means for removing spent alumina or solid caustic soda. During operation the column was sealed to the atmosphere.

*Example I*

A charge of vinyl chloride monomer within which some prepolymerization had already begun was fed from a storage tank into the bottom of a column which was filled with activated alumina having a mesh size of 4. The vinyl chloride monomer, which was removed from the top of the column, was passed through the column at a flow rate of 1.25 gallons per minute per cubit foot of alumina. This provided a contact time between monomer and alumina of about 6 minutes. The monomer treated in this manner was tested under relatively severe conditions and was found to be stabilized against prepolymerization for a period which, when equated to normal plant conditions, would be far in excess of 60 days. In other words, at the end of this period of testing under rigorous conditions, when the tests were terminated, no polymer was found to be present within the treated vinyl chloride monomer.

*Example II*

Where vinyl chloride monomer was treated under conditions identical to those of Example I except that a contact time between monomer and alumina of 5 minutes was effected (3 mesh alumina, contacted with monomer at a flow rate of 1 gallon per minute per cubic foot of alumina), prepolymerization was prevented for a period of approximately 60 days equated to normal plant conditions.

*Example III*

To the column described was added activated alumina having a mesh size of 8. When vinyl chloride monomer was passed through this column at a velocity of 1.5 gallons per minute per cubic foot of alumina (providing a contact time of approximately 8 minutes) it was found that the vinyl chloride monomer was inhibited against prepolymerization for a period of greater than 60 days under normal plant conditions.

*Example IV*

Solid sodium hydroxide pellets having a particle size of 4 mesh was charged into an iron column. Vinyl chloride monomer, within which prepolymerization had already begun, was charged into the column at a flow rate of 1.5 gallons per minute per cubic foot of caustic soda, providing a contact time of approximately 8 minutes. The vinyl chloride monomer thus treated was then sent to storage. The monomer showed no signs of continuing polymerization and the phenomenon of prepolymerization did not again manifest itself even at the end of a period of 30 days.

*Example V*

When Example IV was repeated in all details except that 8 mesh solid sodium hydroxide was used and the contact time between the solid caustic soda and the vinyl chloride monomer was increased to 10 minutes, it was found that the prepolymerization was prevented for what would correspond to a period of approximately 40 days under ordinary plant conditions.

*Example VI*

When portions of vinyl chloride monomer, stabilized against prepolymerization as in Examples I through V, were subjected to normal suspension polymerization, no adverse effects whatever were found either with regard to the polymerization process itself or with regard to the properties of the polymer produced. There was no increase in the time required for polymerization nor was there a decrease in the molecular weight of the polymer. Other polymerization properties were also completely unaffected.

Pursuant to this invention, additional important advantages are also gained. For example, the beds of activated alumina, solid sodium hydroxide or mixtures of these compounds act as a filtering medium to remove insoluble compounds and even to reduce the level of the soluble impurities themselves. Thus, where preformed polymer is present it is removed, and where iron is present its concentration level within the monomer is reduced, the presence of the latter impurity being intolerable at even levels measured in less than one part, per million parts of monomer. In addition, the acidity of the monomer is reduced, particularly where solid sodium hydroxide is used, thus even preventing the solution of iron by the monomer when the monomer comes into contact therewith.

It will be understood that potassium hydroxide may, if desired, be used in place of or in association with the treating agents described above.

Having fully described the present invention, the need therefor, and the best mode devised for carrying it out, it is not intended that this invention be limited except within the spirit and scope of the appended claims.

What is claimed is:

1. A process for stabilizing vinyl chloride monomer against prepolymerization comprising contacting the vinyl chloride monomer with a compound selected from the group consisting of activated alumina, solid sodium hydroxide and mixtures thereof.

2. The process of claim 1 wherein the contact time between the vinyl chloride monomer and the compound is for a period of from about 2 minutes to about 10 minutes.

3. The process for stabilizing vinyl chloride monomer against pre-polymerization comprising contacting the vinyl chloride monomer with activated alumina for a period of from about 2 minutes to about 10 minutes.

4. The process for stabilizing vinyl chloride monomer against pre-polymerization comprising contacting the vinyl chloride monomer with solid sodium hydroxide for a period of from about 2 minutes to about 10 minutes.

5. The process of stabilizing vinyl chloride monomer against pre-polymerization comprising percolating the vinyl chloride monomer through a mixture of activated alumina and solid sodium hydroxide.

6. The process of claim 5 wherein the alumina:caustic ratio is about 2:1.

7. The process of claim 5 wherein the contact time is from about 5 to 8 minutes.

References Cited in the file of this patent

UNITED STATES PATENTS 2,356,562   Berg et al. _____ Aug. 22, 1944